US012124505B2

(12) United States Patent
Barkan et al.

(10) Patent No.: US 12,124,505 B2
(45) Date of Patent: Oct. 22, 2024

(54) SONG SIMILARITY DETERMINATION

(71) Applicant: MICROSOFT TECHNOLOGY LICENSING, LLC, Redmond, WA (US)

(72) Inventors: Oren Barkan, Herzelia (IL); Noam Koenigstein, Herzelia (IL); Nir Nice, Kfar Veradim (IL)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 66 days.

(21) Appl. No.: 17/740,506

(22) Filed: May 10, 2022

(65) Prior Publication Data
US 2022/0269723 A1    Aug. 25, 2022

Related U.S. Application Data

(63) Continuation of application No. 15/605,370, filed on May 25, 2017, now Pat. No. 11,328,010.

(51) Int. Cl.
| G06F 16/00 | (2019.01) |
| G06F 16/632 | (2019.01) |
| G06F 16/635 | (2019.01) |
| G06F 16/638 | (2019.01) |
| G06F 16/683 | (2019.01) |

(52) U.S. Cl.
CPC .......... G06F 16/639 (2019.01); G06F 16/634 (2019.01); G06F 16/637 (2019.01); G06F 16/683 (2019.01)

(58) Field of Classification Search
CPC .... G06F 16/637; G06F 16/683; G06F 16/639; G06F 16/634

USPC ......................................... 707/749
See application file for complete search history.

(56) References Cited

U.S. PATENT DOCUMENTS

| 2008/0235283 A1* | 9/2008 | Turnball | G11B 27/11 |
| 2009/0012635 A1* | 1/2009 | Hicken | G06F 16/683 |
| | | | 707/E17.101 |
| 2009/0216622 A1* | 8/2009 | Hoashi | G06F 16/683 |
| | | | 707/999.107 |
| 2009/0306797 A1* | 12/2009 | Cox | G06F 16/683 |
| | | | 707/E17.103 |
| 2011/0202567 A1* | 8/2011 | Bach | G06F 16/637 |
| | | | 707/784 |
| 2014/0074846 A1* | 3/2014 | Moss | H04L 65/60 |
| | | | 707/740 |
| 2018/0357548 A1* | 12/2018 | Nichols | G06N 20/00 |

* cited by examiner

*Primary Examiner* — Vincent F Boccio
(74) *Attorney, Agent, or Firm* — Shook, Hardy & Bacon L.L.P.

(57) ABSTRACT

Aspects of the technology described herein use acoustic features of a music track to capture information for a recommendation system. The recommendation can work without analyzing label data (e.g., genre, artist) or usage data for a track. For each audio track, a descriptor is generated that can be used to compare the track to other tracks. The comparisons between track descriptors result in a similarity measure that can be used to make a recommendation. In this process, the audio descriptors are used directly to form a track-to-track similarity measure between tracks. By measuring the similarity between a track that a user is known to like and an unknown track, a decision can be made whether to recommend the unknown track to the user.

20 Claims, 6 Drawing Sheets

SONG SIMILARITY DETERMINATION

CROSS-REFERENCE TO RELATED APPLICATIONS

This application is a continuation of U.S. patent application Ser. No. 15/605,370, filed on May 25, 2017, titled "SONG SIMILARITY DETERMINATION" the entirety of which is hereby incorporated by reference.

BACKGROUND

Currently, song recommendation systems that rely on listening data to make song recommendations cannot recommend new songs to users. Recommendation systems are a key discovery experience. The importance of a recommendation system increases in domains where the item catalog is large and the majority of the items on offer are not familiar to the majority of users. This is true for many multimedia domains (e.g., movies, TV, video games, books, and music). There are two main underlying approaches for most recommendation algorithms: collaborative filtering (e.g., people who like A also tend to like B) and content-based recommendations (recommending items with similar content features (e.g., genre classification, artist) as the items the user has consumed in the past).

In the context of music, collaborative filtering recommendations will recommend music tracks that were listened to by other users with a similar musical taste. However, the catalog of available tracks is incredibly large (typically tens to hundreds of millions), and large parts of the catalog consist of tracks that nobody listened to in the past. In addition to the songs with no listening data, songs can have too little listening data to make a statistically significant classification. Accordingly, collaborative filtering approaches can have a very poor coverage of the available catalog. This problem causes a severe difficulty for systems that want to make music recommendations because no previous usage patterns are available for collaborative filtering techniques.

Content-based algorithms are based on item features or metadata. They do not require any past usage patterns and hence do not suffer from the cold-start problem. In the context of music recommendations, the prominent approach in the industry is to employ human experts that tag music tracks, e.g., the Music Genome Project. This method helps mitigate collaborative filtering's cold-start problem, but it is expensive and slow as it requires a large-scale manual tagging effort. Another shortcoming of manual tags is that they are often unable to provide the same quality of music recommendations as collaborative filtering techniques because they are limited by the small amount of information that is encoded by the tags. Namely, tag-based recommendations are often unable to capture fine subtleties that were not properly captured by the tags.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the technology described herein use the actual acoustic features of a music track to capture the relevant information for a recommendation system. The recommendation can work without analyzing label data (e.g., genre, artist) or usage data for a track. For each audio track, a descriptor is generated that can be used to compare the track to other tracks. The descriptor can take the form of a multivariable vector. The comparisons between track descriptors result in a similarity measure that can be used by a content-based recommendation system to make a recommendation. In this process, the audio descriptors are used directly to form a track-to-track similarity measure between tracks. By measuring the similarity between a track that a user is known to like and an unknown track, a decision can be made whether to recommend the unknown track to the user.

The recommendation can take several forms. In one aspect, the recommendation is a notification suggesting a song to the user. In another aspect, the recommendation is adding a song to an automated playlist for a user. An automated playlist may be generated based on a combination of explicit user input, usage data for the user, metadata describing songs, and other inputs without the user selecting songs for the list. In other words, at least some of the songs in an automatic playlist are selected without user input. In contrast, a manual playlist is created by a user selecting the songs.

BRIEF DESCRIPTION OF THE DRAWINGS

The technology described herein is illustrated by way of example and not limitation in the accompanying figures in which like reference numerals indicate similar elements and in which.

DETAILED DESCRIPTION

The various technology described herein are set forth with sufficient specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein use the actual acoustic features of a music track to capture the relevant information for a recommendation system. The recommendation can work without analyzing label data (e.g., genre, artist) or usage data for a track. For each audio track, a descriptor is generated that can be used to compare the track to other tracks. The descriptor can take the form of a multivariable vector. The comparisons between track descriptors result in a similarity measure that can be used by a content-based recommendation system to make a recommendation. In this process, the audio descriptors are used directly to form a track-to-track similarity measure between tracks. By measuring the similarity between a track that a user is known to like and an unknown track, a decision can be made whether to recommend the unknown track to the user.

The system is also able to measure the similarity between artists, albums, and any other types of related audio entities, and make recommendations for these entities using descriptors calculated for audio tracks associated with the entities. The similarity measure generated by comparing the audio descriptors has an accuracy that is high enough to distinguish between intra-genre subtleties. For example, it enables identifying similar tracks within the "classical" music genre.

The recommendation can take several forms. In one aspect, the recommendation is a notification suggesting a song to the user. In another aspect, the recommendation is adding a song to an automated playlist for a user. An automated playlist may be generated based on a combination of explicit user input, usage data for the user, metadata describing songs, and other inputs without the user selecting songs for the list. In other words, at least some of the songs in an automatic playlist are selected without user input. In contrast, a manual playlist is created by a user selecting the songs.

Having briefly described an overview of aspects of the technology described herein, an exemplary operating environment in which aspects of the technology described herein may be implemented is described below in order to provide a general context for various aspects.

Figure 1:
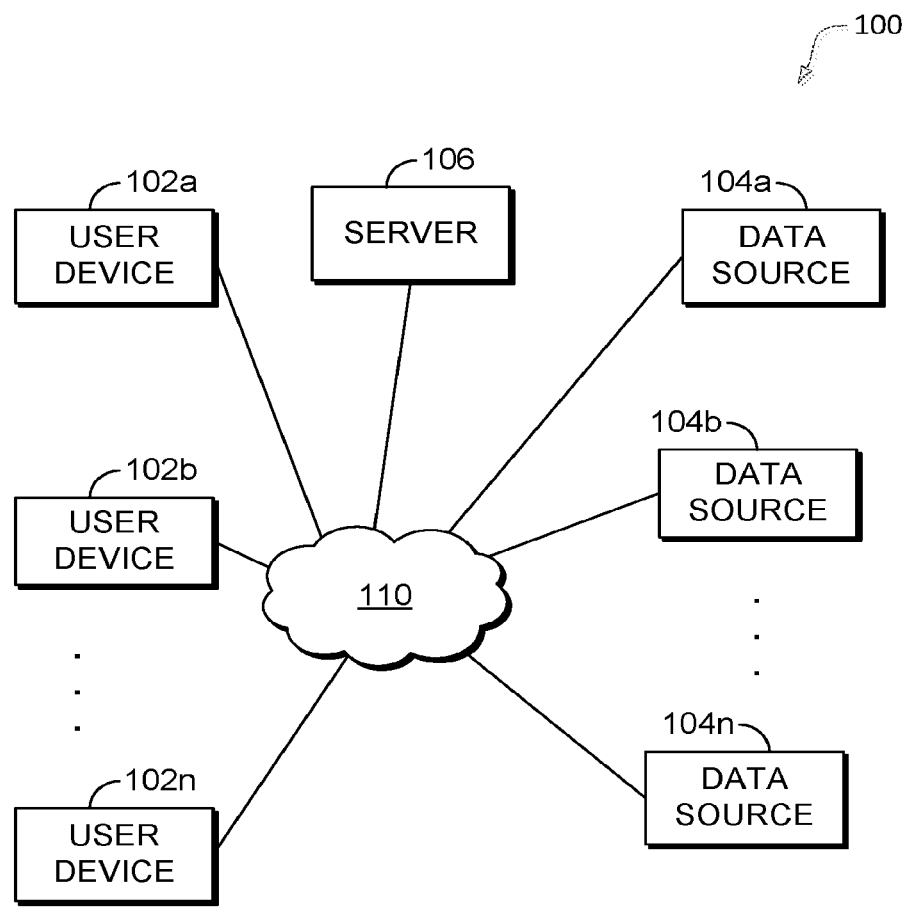
FIG. 1 is a block diagram of an example operating environment suitable for implementations of the present disclosure.

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102*a* and 102*b* through 102*n*; a number of data sources, such as data sources 104*a* and 104*b* through 104*n*; server 106; and network 110. Each of the components shown in FIG. 1 may be implemented via any type of computing device, such as computing device 700 described in connection to FIG. 7, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

User devices 102*a* and 102*b* through 102*n* can be client devices on the client-side of operating environment 100, while server 106 can be on the server-side of operating environment 100. The user devices can facilitate the completion of tasks, such as playing music, facilitating media purchase, and outputting recommendations to the user. The devices can belong to many different users and a single user may use multiple devices. The user activities can be analyzed to determine a user's musical interests, including songs listened to and/or purchased. The user's listening habits can be collected on a user device and communicated to a server for analysis. Some listening activities occur only on the user device, for example, when music stored on the user device is played. Other activities, such as streaming media, require interactions between multiple computing devices.

Server 106 can comprise server-side software designed to work in conjunction with client-side software on user devices 102*a* and 102*b* through 102*n* to implement any combination of the features and functionalities discussed in the present disclosure. For example, the server 106 may run recommendation engine 260, which identifies new music a specific user may be interested in hearing. The server 106 may receive listening records from a large number of user devices belonging to many users. This data can be described as crowdsourced data. The listening records can also be provided by music services. The listening records can be analyzed to determine user preferences. This division of operating environment 100 is provided to illustrate one example of a suitable environment, and there is no requirement for each implementation that any combination of server 106 and user devices 102*a* and 102*b* through 102*n* remain as separate entities.

User devices 102*a* and 102*b* through 102*n* may comprise any type of computing device capable of use by a user. For example, in one aspect, user devices 102*a* through 102*n* may be the type of computing device described in relation to FIG. 7 herein. By way of example and not limitation, a user device may be embodied as a personal computer (PC), a laptop computer, a mobile device, a smartphone, a tablet computer, a smart watch, a wearable computer, a fitness tracker, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

Data sources 104*a* and 104*b* through 104*n* may comprise data sources and/or data systems, which are configured to make data available to any of the various constituents of operating environment 100, or system 200 described in connection to FIG. 2. (For example, in one aspect, one or more data sources 104*a* through 104*n* provide (or make available for accessing) user data to a user-data collection component that generates song usage data store 220 of FIG. 2.) Data sources 104*a* and 104*b* through 104*n* may be discrete from user devices 102*a* and 102*b* through 102*n* and server 106 or may be incorporated and/or integrated into at least one of those components. The data sources 104*a* through 104*n* can comprise a knowledge base that stores information about media, such as classification data (e.g., genre, artist) or usage data. The data sources can also store the actual media that may be for sale or for streaming. The data sources 104a through 104n can also include websites associated with the music industry, such as artist or studio websites and third-party websites that provide music reviews or ratings.

Figure 2:
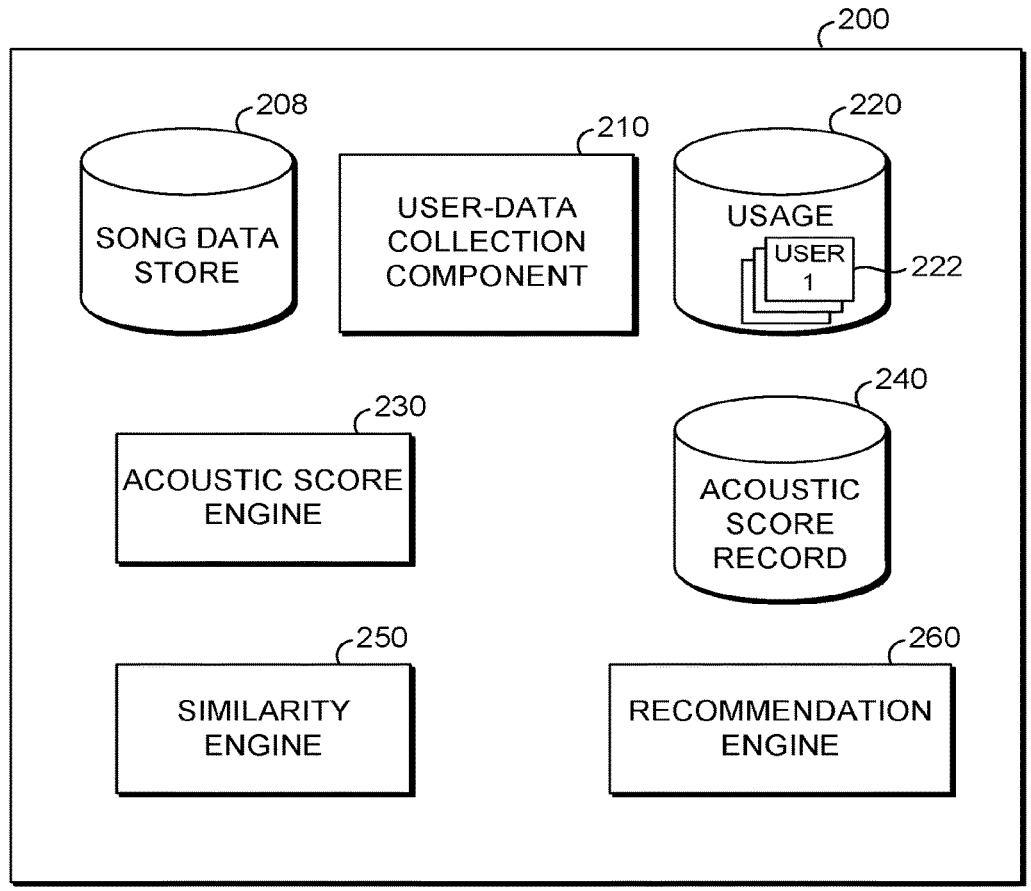
FIG. 2 is a diagram depicting an example computing architecture suitable for implementing aspects of the present disclosure.

Operating environment 100 can be utilized to implement one or more of the components of system 200, described in FIG. 2, including components for collecting user data, identifying user musical interests, determining the similarity between songs, and recommending songs to users.

Referring now to FIG. 2, with FIG. 1, a block diagram is provided showing aspects of an example computing system architecture suitable for implementing an aspect and designated generally as system 200. System 200 represents only one example of a suitable computing system architecture for determining similarity between songs. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes song data store 208, user-data collection component 210, song usage data store 220, acoustic score engine 230, acoustic score data store 240, similarity engine 250, and recommendation engine 260. These components may be embodied as a set of compiled computer instructions or functions, program modules, computer software services, or an arrangement of processes carried out on one or more computer systems, such as computing device 700 described in connection to FIG. 7, for example.

The song data store 208 comprises computer storage with digital recordings of a plurality of songs. The digital recordings can be used to form a data stream to a user device as part of a media streaming service. The digital recordings could also be downloaded to a device for offline use. For purposes of the technology described herein, the digital recordings may be analyzed to generate an acoustic score, which is then used as input to determine a similarity between different songs. The acoustic score engine 230 may access digital recordings for analysis.

The songs may be stored with metadata that provide a unique identifier and provide other information such as the artist, album, genre, songwriters, producers, record label, studio, or other information about the song recorded on the digital recording. Some songs may be associated with usage data within the song usage data store 220. Usage data can include listening data and sales data along with people associated with the listening data and sales data. The usage data can be used to make recommendations that are derived from usage patterns. Some songs or digital recordings, such as those newly added to the database, are associated with no usage data. Other songs are associated with less than a statistically significant amount of usage data. Less than statistically significant means that a machine-learning method is not able to use the amount of usage information to generate a recommendation for the song with above a threshold amount of confidence. Confidence refers to a confidence factor, which is a statistical calculation that can indicate a strength of association. A low confidence factor can indicate a weak correlation in the presence of a large amount of data or a lack of data.

Continuing with FIG. 2, user-data collection component 210 is generally responsible for accessing or receiving (and in some cases also identifying) user data from one or more data sources, such as data sources 104a and 104b through 104n of FIG. 1. The user data can comprise music usage data that is stored in song usage data store 220. In some aspects, user-data collection component 210 may be employed to facilitate the accumulation of user data of a particular user (or in some cases, a plurality of users including crowd-sourced data). The data may be received (or accessed), and optionally accumulated, reformatted, and/or combined, by user-data collection component 210 and stored in one or more data stores, where it may be available to other components of system 200. For example, the user listening data may be stored in or associated with a user profile. In some aspects, any personally identifying data (i.e., user data that specifically identifies particular users) is either not uploaded or otherwise provided from the one or more data sources with user data, is not permanently stored, and/or is not made available to other components. For example, a person's listening record may be transmitted to a recommendation engine without any information that identifies the person.

User data may be received from a variety of sources where the data may be available in a variety of formats. For example, in some aspects, user data received via user-data collection component 210 may be determined via one or more sensors, which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both. For example, listening data may be provided by multiple music players or media applications on a device. By way of example and not limitation, user data may include data that is sensed or determined from one or more sensors (referred to herein as sensor data), such as location information of mobile device(s), properties or characteristics of the user device(s) (such as device state, charging data, date/time, or other information derived from a user device such as a mobile device), user-activity information (for example: app usage; online activity; searches; voice data such as automatic speech recognition; activity logs; communications data including calls, texts, instant messages, and emails; website posts; other userdata associated with communication events; etc.) including, in some aspects, user activity that occurs over more than one user device, user history, session logs, application data, contacts data, calendar and schedule data, notification data, social-network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personal assistant application or service), home-sensor data, appliance data, global positioning system (GPS) data, vehicle user data, traffic data, weather data (including forecasts), wearable device data (which may include physiological data about the user such as heart rate, pulse oximeter or blood oxygen level, blood pressure, galvanic skin response, or other physiological data capable of being sensed or detected), other user device data (which may include device settings, profiles, network-related information (e.g., network name or ID, domain information, work group information, connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com, or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, Cellular network, or IP address data), and nearly any other source of data that may be sensed or determined as described herein.

In some respects, user data may be provided in user-data streams or signals. A "user signal" can be a feed or stream of user data from a corresponding data source. For example, a user signal could be from a smartphone, a home-sensor device, a GPS device (e.g., for location coordinates), a vehicle-sensor device, a wearable device, or a personal computer. In some aspects, user-data collection component 210 receives or accesses data continuously, periodically, or as needed.

Song usage data store 220 stores usage records that can be associated with individual users. As mentioned, usage data can be received from user devices and services. The usage data can comprise a record of songs listened to in part or in whole by a user. The song usage data store 220 stores a record of songs each user listens to. The usage data can be used by the recommendation engine 260 to generate a recommendation. Songs can be recommended based on similarity to songs the user currently listens to according to their usage record. Songs can also be recommended based on their similarity to songs listened to by users that have similar listening patterns to an individual user.

Figure 3:
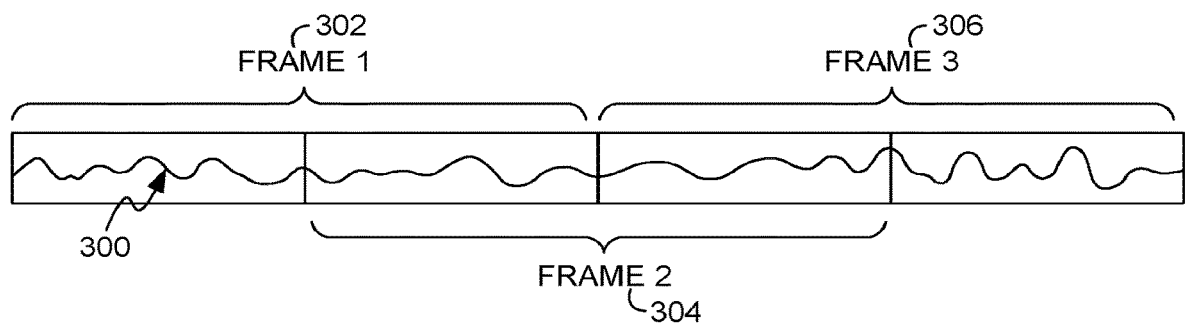
FIG. 3 shows a song segmented into overlapping frames, in accordance with an aspect of the technology described herein.

Acoustic score engine 230 generates an acoustic score for a song. The acoustic score engine 230 retrieves a song from the song data store for analysis. The song is then chopped into a plurality of frames as shown in FIG. 3. The song 300, represented by the wavy line, is broken into a first frame 302, a second frame 304, and a third frame 306. Each frame is the same duration. In the example shown, the frames are half-overlapped, meaning each consecutive frame has half the content from the preceding frame and subsequent frame. In this case, half the content of the second frame 304 overlaps the content in the first frame 302 and half overlaps the content in the third frame 306. Other overlap percentages are possible, for example, a 75%, 40%, 30%, 25%, 15%, or 10% overlap may be used. In one aspect, the frame duration is less than 1 second, such as 900 ms, 740 ms, 520 ms, 300 ms, or 200 ms. Other durations are possible.

Each frame of the song is input to an analysis that generates a feature vector. In one aspect, the feature vector is generated by a wavelet modulus network. The wavelet modulus network can generate the features vector that represents 1940 scattering features. In other words, the initial feature vector has 1940 dimensions. The raw feature vector may be reduced. For example, the 1940 dimensions can be reduced to 40 by applying Whitened Principal Components Analysis (WPCA). The result is a plurality of feature vectors that represent the song. As mentioned, each feature vector is produced per frame.

The feature vectors are then processed to generate a density estimation that represents the entire song. The density estimation can be expressed as a vector that may also be reduced from a large number to a smaller number. In one aspect, a parametric density estimation is applied using a Gaussian Mixture Model (GMM). The density estimation can be generated by running the plurality of features through a universal background model (UBM). The universal background model is generated by training a model using a large number of songs in a separate process. Once trained, the UBM can be used to analyze multiple songs. The UBM essentially represents the average of those songs. The UBM parameters can be learned by a Maximum Likelihood (ML) estimation for GMM. Then, for a given track, the UBM parameters are adapted according to Maximum A-Posteriori (MAP) estimation where the UBM parameters are taken as prior and the frames in the plurality of frames that belong to the given song are used as the data (in the likelihood function). This process produces a density estimation that may be described herein as the acoustic score. In aspects, an acoustic score can be generated for a large number of songs. This allows comparison of each song to the others.

The acoustic score store 240 stores acoustic scores. Once calculated, an acoustic score can be used to compare a song to another song. Scores can be retrieved from the acoustic score store 240 compared to newly generated acoustic scores for new songs.

The similarity engine 250 uses the acoustic scores to generate a similarity score for songs. The acoustic score can be used to generate a similarity score for a first and second song. The similarity score indicates how similar the acoustic score is for the respective songs. In one aspect, a similarity score is generated for each possible combination of songs within the song data store 208.

In an aspect, the technology approximates the KL-divergence between the distributions of the parameters that were estimated in the density estimation step and represented in the acoustic score. Using these parameters, a "supervector" is generated for each song. A supervector is a vector composed of the GMM concatenated adapted centralized means, normalized by the adapted square root weights and UBM's standard deviations. In one aspect, the supervector comprises 256 gaussians (shift vectors), each with 40 dimensions. Then a similarity score is computed by applying cosine similarity (normalized dot product) to a pair of supervectors, where each supervector is derived from a different song. Optionally, a dimensional reduction can be performed on the supervector before running the cosine similarity. The similarity score can then be used to generate a recommendation.

The recommendation engine 260 generates a recommendation using the similarity score(s). The similarity score can be used several different ways to generate a recommendation including in combination with a group of similarity scores. As a preliminary step, the musical taste of the user to whom the recommendation is communicated needs to be determined. Musical taste can be determined in several different ways. In one example, a user's playlist(s) can represent the user's musical taste. The similarity score between a single song or multiple songs on a user's playlist and a new song can be analyzed to determine whether the new song should be added to the playlist. In one aspect, a song is recommended when the similarity score for a song on the playlist is within a range designated for recommendation. In another aspect, the songs on a playlist could be analyzed as a group. For example, the average similarity score between the new song and each song in the playlist could be calculated. If the average is within a range designated for recommending the song, then the song could be added to the playlist or otherwise recommended.

In another aspect, the user's taste can be based on a top threshold of songs (e.g., ten most listened to songs) the user is listening to during a time, such as the last month. If a new song has a similarity score with any of the top threshold songs within a recommendation threshold then the new song is recommended.

The user's musical taste can be expanded using collaborative filtering (e.g., people who like A also tend to like B). In this case, if song A is on the user's playlist, then a new song B that is within a threshold similarity to song A can be added to the user's playlist or otherwise recommended.

The recommendation can take several different forms. In one aspect, the recommendation is the inclusion of a song in a playlist. The playlist can be user specific, specific to a group of users having similar musical taste, genre specific, or organized around some other theme (e.g., sad songs, happy songs, dance songs, workout songs, love songs). An individual user may have several different playlists. The playlist can be used to determine what songs are streamed to a user by a music service.

The recommendation can also take the form of a notification communicated to the user. For example, the recommendation could tell the user that she may like new song B because it is similar to song A, which she listens to regularly. The recommendation could give the user the option to download the song, stream the song, purchase the song, or otherwise provide a means of accessing the song.

The recommendation can also be for an artist, album, producer, songwriter, or some other musical characteristic that includes multiple songs. In this case, songs associated with an artist form a group; songs associated with an album form a group; and so on. Recommendations for groups of songs can be generated by analyzing the similarity of the groups. In one aspect, a similarity score for each song in a first group is generated for each song in a second group forming a plurality of similarity scores. The plurality of scores are then combined to form a group similarity score. In one aspect, the group similarity scores are generated by calculating an average similarity for the plurality of similarity scores.

Once the group similarity score is generated, then a group recommendation can be made based on a user's affinity for a different group. For example, if a user buys several songs recorded by a first artist, then a similar artist could be recommended based on a group analysis.

Figure 4:
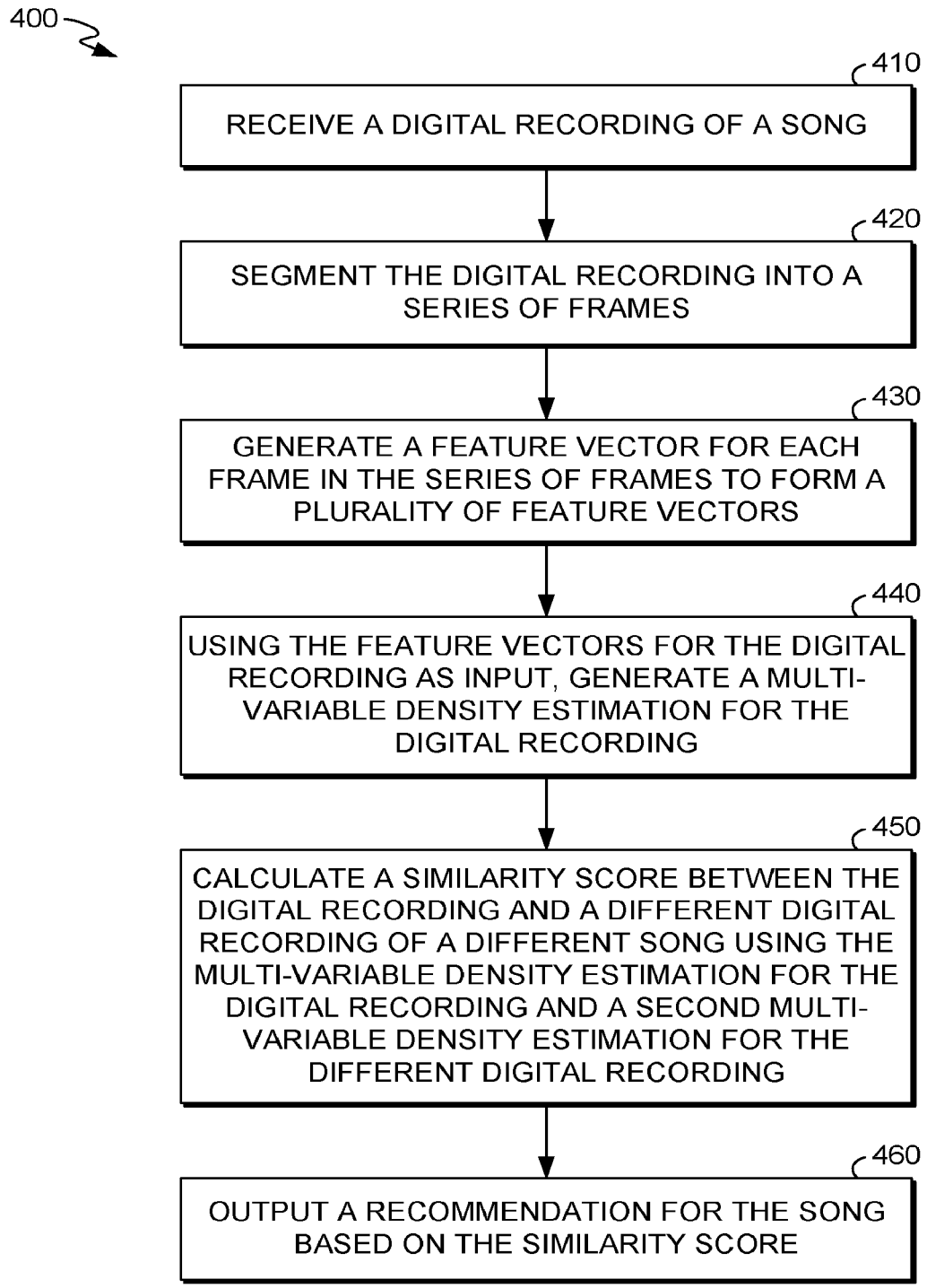
FIGS. 4-6 are flow diagrams showing exemplary methods of inferring a similarity between songs based on an acoustic analysis of the songs, in accordance with an aspect of the technology described herein.

Turning now to FIG. 4, a flow chart showing a method 400 of selecting a song for a user is provided, in accordance with an aspect of the technology described herein. The method 400 can be performed on a server or other computing device. The recommendation can be output by a music service.

At step 410, a digital recording of a song is received. The song can be retrieved from a data store. In one aspect, the song is associated with no usage data, for example, because it is a new song.

At step 420, the digital recording is segmented into a series of frames. The frames can be half-overlapped, meaning each consecutive frame has half the content from the preceding frame and subsequent frame. Other overlap percentages are possible, for example, a 75%, 40%, 30%, 25%, 15%, or 10% overlap may be used. Each frame may be the same duration. In one aspect, the frame duration is less than 1 second, such as 900 ms, 740 ms, 520 ms, 300 ms, or 200 ms. Other durations are possible.

At step 430, a feature vector is generated for each frame in the series of frames to form a plurality of feature vectors. In one aspect, the feature vector is generated by a wavelet modulus network. The wavelet modulus network can generate the features vector that represents 1940 scattering features. In other words, the initial feature vector has 1940 dimensions. The raw feature vectors may be reduced. For example, the 1940 dimensions can be reduced to 40 by applying Whitened Principal Components Analysis (WPCA). The result is a plurality of feature vectors that represent the song. As mentioned, each feature vector is produced from a single frame.

At step 440, using the plurality of feature vectors for the digital recording as input, a multivariable density estimation is generated for the digital recording. The feature vectors are then processed to generate a multivariable density estimation that represents the entire song. The density estimation can be expressed as a vector that may also be reduced from a large number to a smaller number. In one aspect, a parametric density estimation is applied using a Gaussian Mixture Model (GMM). The density estimation can be generated by running the plurality of features through a universal background model (UBM). The universal background model is generated by training a model using a large number of songs in a separate process. Once trained, the UBM can be used to analyze multiple songs. The UMB essentially represents the average of those songs. The UBM parameters can be learned by a Maximum Likelihood (ML) estimation for GMM. Then, for a given track, the UBM parameters are adapted according to Maximum A-Posteriori (MAP) estimation where the UBM parameters are taken as prior and the frames in the plurality of frames that belong to the given song are used as the data (in the likelihood function). This process produces a density estimation that may be described herein as the acoustic score. In aspects, an acoustic score can be generated for a large number of songs. This allows comparison of each song to the others.

At step 450, a similarity score between the digital recording and a different digital recording of a different song is calculated using the multivariable density estimation for the digital recording and a second multivariable density estimation for the different digital recording. The multivariable density estimation (also described herein as an acoustic score) can be used to generate a similarity score for a first and second song. The similarity score indicates how similar the multivariable density estimation is for the respective songs. In one aspect, a similarity score is generated for each possible combination of songs within a song data store.

In an aspect, the technology approximates the KL-divergence between the distributions of the parameters that were estimated in the density estimation step and represented in the acoustic score. Using these parameters, a "supervector" is generated for each song. A supervector is a vector composed of the GMM concatenated adapted centralized means, normalized by the adapted square root weights and UBM's standard deviations. In one aspect, the supervector comprises 256 gaussians (shift vectors), each with 40 dimensions. Then a similarity score is computed by applying cosine similarity (normalized dot product) to a pair of supervectors, where each supervector is derived from a different song. Optionally, a dimensional reduction can be performed on the supervector before running the cosine similarity. The similarity score can then be used to generate a recommendation.

At step 460, a recommendation for the song is output based on the similarity score. The similarity score can be used several different ways to generate a recommendation. As a preliminary step, the musical taste of the user to whom the recommendation is communicated needs to be determined. Musical taste can be determined in several different ways. In one example, a user's playlist(s) can represent the user's musical taste. The similarity score between a single song or multiple songs on a user's playlist and a new song can be analyzed to determine whether the new song should be added to the playlist. In one aspect, a song is recommended when the similarity score for a song on the playlist is within a range designated for recommendation. In another aspect, the songs on a playlist could be analyzed as a group. For example, the average similarity score between the new song and each song in the playlist could be calculated. If the average is within a range designated for recommending the song, then the song could be added to the playlist or otherwise recommended.

In another aspect, the user's taste can be based on a top threshold of songs (e.g., ten most listened to songs) the user is listening to during a time, such as the last month. If a new song has a similarity score with any of the top threshold songs within a recommendation threshold, then the new song is recommended.

The user's musical taste can be expanded using collaborative filtering (e.g., people who like A also tend to like B). In this case, if song A is on the user's playlist, then a new song B that is within a threshold similarity to song A can be added to the user's playlist or otherwise recommended.

The recommendation can take several different forms. In one aspect, the recommendation is the inclusion of a song in a playlist. The playlist can be user specific, specific to a group of users having similar musical taste, genre specific, or organized around some other theme (e.g., sad songs, happy songs, dance songs, workout songs, love songs). An individual user may have several different playlists. The playlist can be used to determine what songs are streamed to a user by a music service.

The recommendation can also take the form of a notification communicated to the user. For example, the recommendation could tell the user that she may like new song B because it is similar to song A, which she listens to regularly. The recommendation could give the user the option to download the song, stream the song, purchase the song, or otherwise provide a means of accessing the song.

Figure 5:
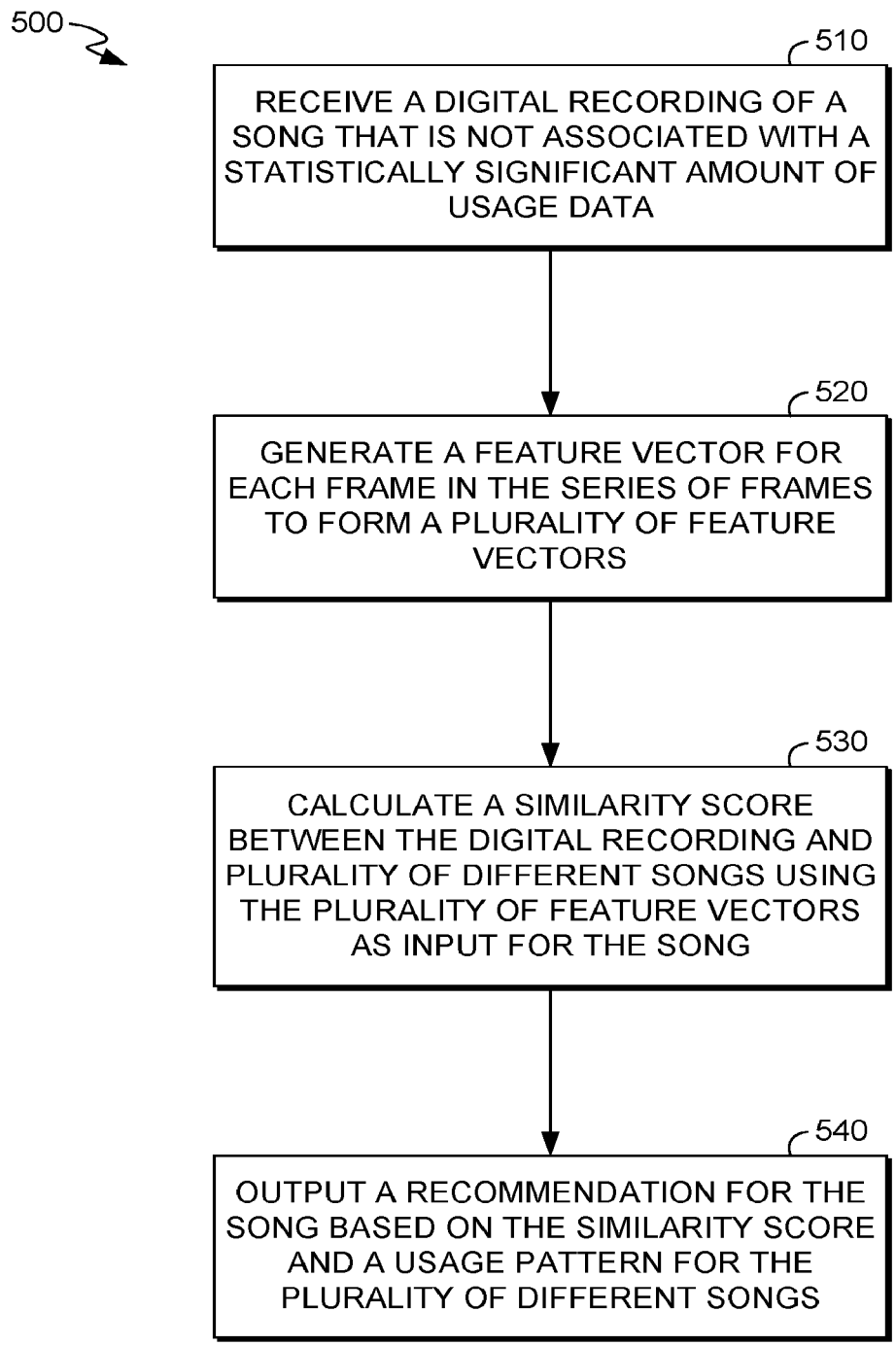

Turning now to FIG. 5, a flow chart showing a method 500 of selecting a song for a user is provided, in accordance with an aspect of the technology described herein. The method 500 can be performed on a server or other computing device. The recommendation can be output by a music service.

At step 510, a digital recording of a song that is not associated with a statistically significant amount of usage data is received. A song does not have a statistically significant amount of usage data when a recommendation engine is not able to make recommendations based on the amount of usage data with above a threshold confidence. The song can be retrieved from a data store. In one aspect, the song is associated with no usage data, for example, because it is a new song.

At step 520, a feature vector for each frame in a series of frames is generated to form a plurality of feature vectors. In one aspect, the feature vector is generated by a wavelet modulus network. The wavelet modulus network can generate the features vector that represents 1940 scattering features. In other words, the initial feature vector has 1940 dimensions. The raw feature vectors may be reduced. For example, the 1940 dimensions can be reduced to 40 by applying Whitened Principal Components Analysis (WPCA). The result is a plurality of feature vectors that represent the song. As mentioned, each feature vector is produced from a single frame.

At step 530, a similarity score is calculated between the digital recording and a plurality of different songs using the plurality of feature vectors as input. In one aspect, the feature vectors are processed to form a multivariable density estimation. The multivariable density estimation (also described herein as an acoustic score) can be used to generate a similarity score for a first and second song. The similarity score indicates how similar the multivariable density estimation is for the respective songs. In one aspect, a similarity score is generated for each possible combination of songs within a song data store.

In an aspect, the technology approximates the KL-divergence between the distributions of the parameters that were estimated in the density estimation step and represented in the acoustic score. Using these parameters, a "supervector" is generated for each song. A supervector is a vector composed of the GMM concatenated adapted centralized means, normalized by the adapted square root weights and UBM's standard deviations. In one aspect, the supervector comprises 256 gaussians (shift vectors), each with 40 dimensions. Then a similarity score is computed by applying cosine similarity (normalized dot product) to a pair of supervectors, where each supervector is derived from a different song. Optionally, a dimensional reduction can be performed on the supervector before running the cosine similarity. The similarity score can then be used to generate a recommendation.

At step 540, a recommendation for the song is output based on the similarity score and a usage pattern for the plurality of different songs. The similarity score can be used several different ways to generate a recommendation. As a preliminary step, the musical taste of the user to whom the recommendation is communicated needs to be determined. Musical taste can be determined in several different ways. In one example, a user's playlist(s) can represent the user's musical taste. The similarity score between a single song or multiple songs on a user's playlist and a new song can be analyzed to determine whether the new song should be added to the playlist. In one aspect, a song is recommended when the similarity score for a song on the playlist is within a range designated for recommendation. In another aspect, the songs on a playlist could be analyzed as a group. For example, the average similarity score between the new song and each song in the playlist could be calculated. If the average is within a range designated for recommending the song, then the song could be added to the playlist or otherwise recommended.

In another aspect, the user's taste can be based on a top threshold of songs (e.g., ten most listened to songs) the user is listening to during a time, such as the last month. If a new song has a similarity score with any of the top threshold songs within a recommendation threshold, then the new song is recommended.

The user's musical taste can be expanded using collaborative filtering (e.g., people who like A also tend to like B). In this case, if song A is on the user's playlist, then a new song B that is within a threshold similarity to song A can be added to the user's playlist or otherwise recommended.

The recommendation can take several different forms. In one aspect, the recommendation is the inclusion of a song in a playlist. The playlist can be user specific, specific to a group of users having similar musical taste, genre specific, or organized around some other theme (e.g., sad songs, happy songs, dance songs, workout songs, love songs). An individual user may have several different playlists. The playlist can be used to determine what songs are streamed to a user by a music service.

The recommendation can also take the form of a notification communicated to the user. For example, the recommendation could tell the user that she may like new song B because it is similar to song A, which she listens to regularly. The recommendation could give the user the option to download the song, stream the song, purchase the song, or otherwise provide a means of accessing the song.

Figure 6:
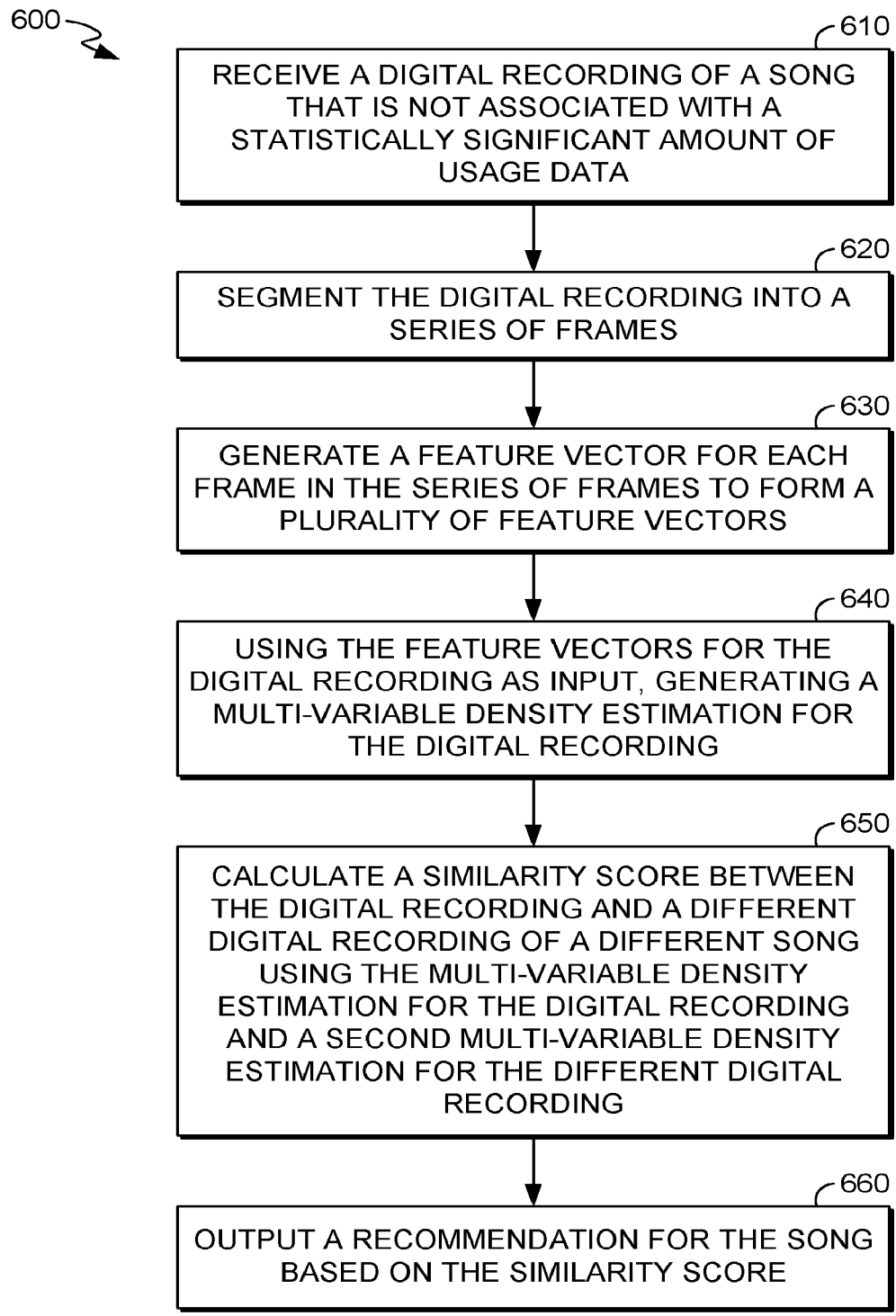

Turning now to FIG. 6, a flow chart showing a method 600 of selecting a song for a user is provided, in accordance with an aspect of the technology described herein. The method 600 can be performed on a server or other computing device. The recommendation can be output by a music service.

At step 610, a digital recording of a song that is not associated with a statistically significant amount of usage data is received. A song does not have a statistically significant amount of usage data when a recommendation engine is not able to make recommendations based on the amount of usage data with above a threshold confidence. The song can be retrieved from a data store. In one aspect, the song is associated with no usage data, for example, because it is a new song.

At step 620, the digital recording is segmented into a series of frames. The frames can be half-overlapped, meaning each consecutive frame has half the content from the preceding frame and subsequent frame. Other overlap percentages are possible, for example, a 75%, 40%, 30%, 25%, 15%, or 10% overlap may be used. Each frame may be the same duration. In one aspect, the frame duration is less than 1 second, such as 900 ms, 740 ms, 520 ms, 300 ms, or 200 ms. Other durations are possible.

At step 630, a feature vector for each frame in the series of frames is generated to form a plurality of feature vectors. In one aspect, the feature vector is generated by a wavelet modulus network. The wavelet modulus network can generate the features vector that represents 1940 scattering features. In other words, the initial feature vector has 1940 dimensions. The raw feature vectors may be reduced. For example, the 1940 dimensions can be reduced to 40 by applying Whitened Principal Components Analysis (WPCA). The result is a plurality of feature vectors that represent the song. As mentioned, each feature vector is produced from a single frame.

At step 640, using the plurality of feature vectors for the digital recording as input, a multivariable density estimation is generated for the digital recording. The feature vectors are then processed to generate a multivariable density estimation that represents the entire song. The density estimation can be expressed as a vector that may also be reduced from a large number to a smaller number. In one aspect, a parametric density estimation is applied using a Gaussian Mixture Model (GMM). The density estimation can be generated by running the plurality of features through a universal background model (UBM). The universal background model is generated by training a model using a large number of songs in a separate process. Once trained, the UBM can be used to analyze multiple songs. The UMB essentially represents the average of those songs. The UBM parameters can be learned by a Maximum Likelihood (ML) estimation for GMM. Then, for a given track, the UBM parameters are adapted according to Maximum A-Posteriori (MAP) estimation where the UBM parameters are taken as prior and the frames in the plurality of frames that belong to the given song are used as the data (in the likelihood function). This process produces a density estimation that may be described herein as the acoustic score. In aspects, an acoustic score can be generated for a large number of songs. This allows comparison of each song to the others.

At step 650, a similarity score between the digital recording and a different digital recording of a different song is calculated using the multivariable density estimation for the digital recording and a second multivariable density estimation for the different digital recording. The multivariable density estimation (also described herein as an acoustic score) can be used to generate a similarity score for a first and second song. The similarity score indicates how similar the multivariable density estimation is for the respective songs. In one aspect, a similarity score is generated for each possible combination of songs within a song data store.

In an aspect, the technology approximates the KL-divergence between the distributions of the parameters that were estimated in the density estimation step and represented in the acoustic score. Using these parameters, a "supervector" is generated for each song. A supervector is a vector composed of the GMM concatenated adapted centralized means, normalized by the adapted square root weights and UBM's standard deviations. In one aspect, the supervector comprises 256 gaussians (shift vectors), each with 40 dimensions. Then a similarity score is computed by applying cosine similarity (normalized dot product) to a pair of supervectors, where each supervector is derived from a different song. Optionally, a dimensional reduction can be performed on the supervector before running the cosine similarity. The similarity score can then be used to generate a recommendation.

At step 660, a recommendation based on the similarity score is output. The similarity score can be used several different ways to generate a recommendation. As a preliminary step, the musical taste of the user to whom the recommendation is communicated needs to be determined. Musical taste can be determined in several different ways. In one example, a user's playlist(s) can represent the user's musical taste. The similarity score between a single song or multiple songs on a user's playlist and a new song can be analyzed to determine whether the new song should be added to the playlist. In one aspect, a song is recommended when the similarity score for a song on the playlist is within a range designated for recommendation. In another aspect, the songs on a playlist could be analyzed as a group. For example, the average similarity score between the new song and each song in the playlist could be calculated. If the average is within a range designated for recommending the song, then the song could be added to the playlist or otherwise recommended.

In another aspect, the user's taste can be based on a top threshold of songs (e.g., ten most listened to songs) the user is listening to during a time, such as the last month. If a new song has a similarity score with any of the top threshold songs within a recommendation threshold, then the new song is recommended.

The user's musical taste can be expanded using collaborative filtering (e.g., people who like A also tend to like B). In this case, if song A is on the user's playlist, then a new song B that is within a threshold similarity to song A can be added to the user's playlist or otherwise recommended.

The recommendation can take several different forms. In one aspect, the recommendation is the inclusion of a song in a playlist. The playlist can be user specific, specific to a group of users having similar musical taste, genre specific, or organized around some other theme (e.g., sad songs, happy songs, dance songs, workout songs, love songs). An individual user may have several different playlists. The playlist can be used to determine what songs are streamed to a user by a music service.

The recommendation can also take the form of a notification communicated to the user. For example, the recommendation could tell the user that she may like new song B because it is similar to song A, which she listens to regularly. The recommendation could give the user the option to download the song, stream the song, purchase the song, or otherwise provide a means of accessing the song.

The recommendation can also be for an artist, album, producer, songwriter, or some other musical characteristic that includes multiple songs. In this case, songs associated with an artist form a group; songs associated with an album form a group; and so on. Recommendations for groups of songs can be generated by analyzing the similarity of the groups. In one aspect, a similarity score for each song in a first group is generated for each song in a second group forming a plurality of similarity scores. The plurality of scores are then combined to form a group similarity score. In one aspect, the group similarity scores are generated by calculating an average similarity for the plurality of similarity scores.

Exemplary Operating Environment

Figure 7:
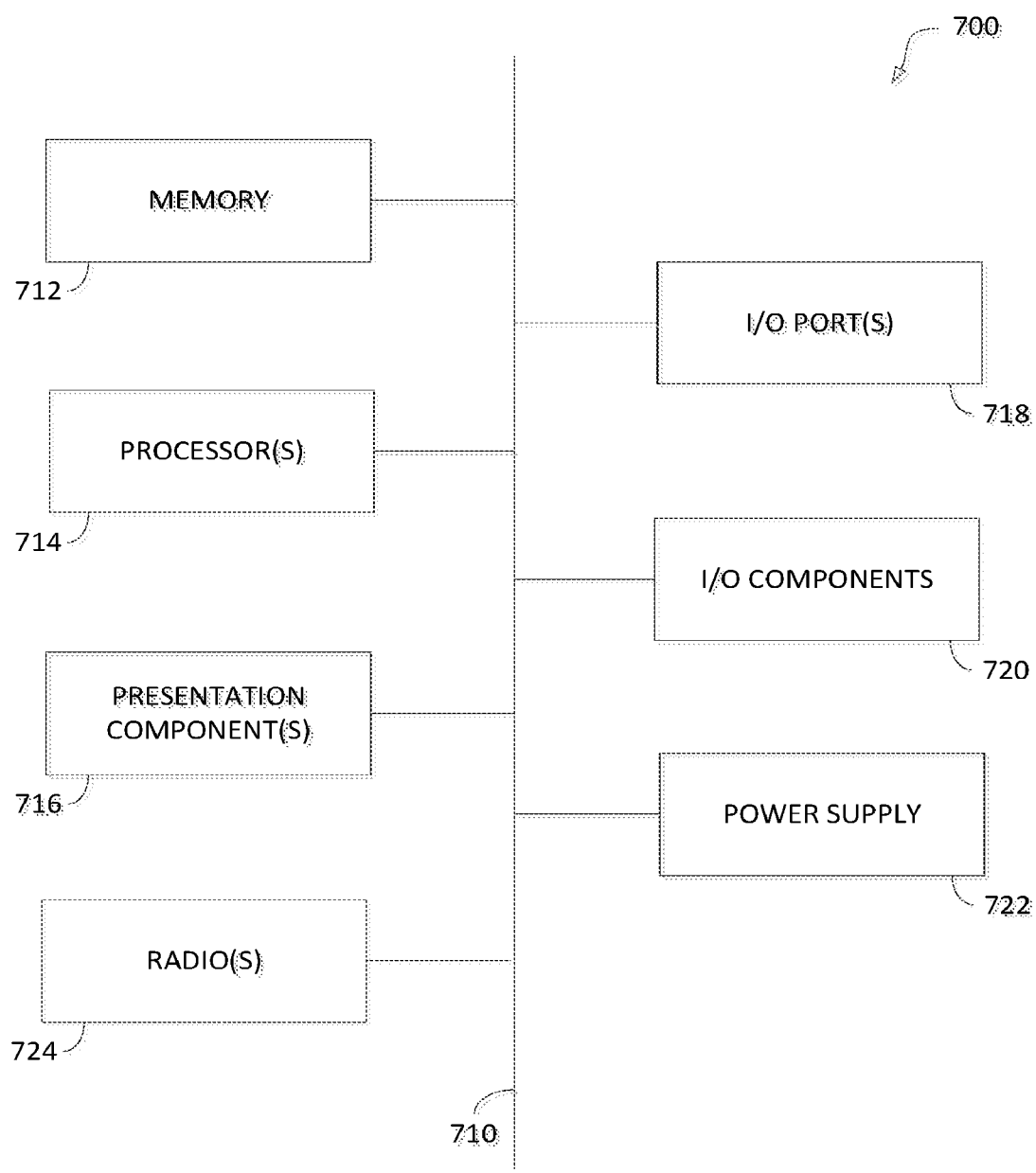
FIG. 7 is a block diagram of an exemplary computing environment suitable for use in implementing aspects of the technology described herein.

Referring to the drawings in general, and initially to FIG. 7 in particular, an exemplary operating environment for implementing aspects of the technology described herein is shown and designated generally as computing device 700. Computing device 700 is but one example of a suitable computing environment and is not intended to suggest any limitation as to the scope of use of the technology described herein. Neither should the computing device 700 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 7, computing device 700 includes a bus 710 that directly or indirectly couples the following devices: memory 712, one or more processors 714, one or more presentation components 716, input/output (I/O) ports 718, I/O components 720, and an illustrative power supply 722. Bus 710 represents what may be one or more busses (such as an address bus, data bus, or a combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 7 and refer to "computer" or "computing device."

Computing device 700 typically includes a variety of computer-readable media. Computer-readable media can be any available media that can be accessed by computing device 700 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer storage media in the form of volatile and/or nonvolatile memory. The memory 712 may be removable, non-removable, or a combination thereof. Exemplary memory includes solid-state memory, hard drives, optical-disc drives, etc. Computing device 700 includes one or more processors 714 that read data from various entities such as bus 710, memory 712, or I/O components 720. Presentation component(s) 716 present data indications to a user or other device. Exemplary presentation components 716 include a display device, speaker, printing component, vibrating component, etc. I/O ports 718 allow computing device 700 to be logically coupled to other devices, including I/O components 720, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 714 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 700. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

A computing device may include a radio 724. The radio 724 transmits and receives radio communications. The computing device may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

EMBODIMENTS

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

What is claimed is:

1. One or more computer storage media comprising computer-executable instructions that when executed by a computing device cause the computing device to perform a method of selecting a song for a user, comprising:
   receiving a digital recording of a song comprising a series of frames;
   generating a plurality of feature vectors from the series of frames;
   using the plurality of feature vectors for the digital recording as input to a probability distribution model that determines differences between the plurality of feature vectors and a mean feature distribution generated from a plurality of songs and normalizes the differences between the plurality of feature vectors and the mean feature distribution, generating a multivariable density estimation for the digital recording;
   calculating a similarity score between the digital recording and a different digital recording of a different song by comparing the multivariable density estimation for the digital recording to a second multivariable density estimation for the different digital recording; and
   outputting a recommendation based on the similarity score.

2. The media of claim 1, wherein consecutive frames within the series of frames overlap.

3. The media of claim 1, wherein the song is performed by a first artist, the method further comprising determining that the first artist is similar to a second artist by comparing similarity scores between the song and a plurality of songs by the second artist.

4. The media of claim 1, wherein the plurality of feature vectors are generated using a dimensional reduction method to reduce an amount of variables in an individual feature vector.

5. The media of claim 1, wherein the probability distribution model normalizes the differences between the plurality of feature vectors and the mean feature distribution based on standard deviations based on the differences between the plurality of feature vectors and the mean feature distribution.

6. The media of claim 1, wherein the similarity score is calculated using cosine similarity.

7. The media of claim 1, wherein the different digital recording of the different song is selected to calculate the similarity score based on usage data, the usage data indicating the user likes the different digital recording based on inclusion of the different song in a play list.

8. A method of selecting a song for a user, the method comprising:
   determining that a digital recording of a song does not have a statistically significant amount of usage data;
   generating a plurality of feature vectors from frames in the digital recording;
   using the plurality of feature vectors for the digital recording as input to a probability distribution model that determines differences between the plurality of feature vectors and a mean feature distribution generated from a plurality of songs and normalizes the differences between the plurality of feature vectors and the mean feature distribution, generating a multivariable density estimation for the digital recording;
   calculating a similarity score between the digital recording and a different digital recording of a different song by comparing the multivariable density estimation for the digital recording to a second multivariable density estimation for the different digital recording; and outputting a recommendation based on the similarity score.

9. The method of claim 8, wherein consecutive frames in the series of frames are overlapping.

10. The method of claim 8, wherein the recommendation is a genre classification.

11. The method of claim 8, wherein the song is performed by a first artist, the method further comprising determining that the first artist is similar to a second artist by comparing similarity scores for the song with a plurality of songs by the second artist.

12. The method of claim 8, wherein the song is included on a first album, the method further comprising determining that the first album is similar to a second album by comparing similarity scores for the song with a plurality of songs on the second album.

13. The method of claim 8, wherein the recommendation is a notification suggesting the user listen to the song.

14. The method of claim 8, wherein the different digital recording of the different song is selected to calculate the similarity score based on the usage data, the usage data indicating the user likes the different digital recording based on inclusion of the different song in a play list.

15. The method of claim 8, wherein the usage pattern for the plurality of different songs is generated by a digital music streaming service.

16. A method of selecting a song for a user comprising:
receiving a digital recording of a song that is not associated with a statistically significant amount of usage data;
generating a plurality of feature vectors from frames m the digital recording;
using the plurality of feature vectors for the digital recording as input to a probability distribution model that determines differences between the plurality of feature vectors and a mean feature distribution generated from a plurality of songs and normalizes the differences between the plurality of feature vectors and the mean feature distribution, generating a multivariable density estimation for the digital recording;
calculating a similarity score between the digital recording and a different digital recording of a different song by comparing the multivariable density estimation for the digital recording to a second multivariable density estimation for the different digital recording; and
outputting a recommendation based on the similarity score.

17. The method of claim 16, wherein the similarity score is calculated without usage data for the digital recording or the different digital recording.

18. The method of claim 16, wherein the similarity score is calculated without using a genre classification, an album title, or an artist for the digital recording, or a genre classification, an album title, or an artist for the different digital recording.

19. The method of claim 16, wherein the probability distribution model normalizes the differences between the plurality of feature vectors and the mean feature distribution based on standard deviations based on the differences between the plurality of feature vectors and the mean feature distribution.

20. The method of claim 16, wherein the recommendation is inclusion in a playlist that includes the different song.

* * * * *